(12) United States Patent
Zhang et al.

(10) Patent No.: US 11,578,227 B2
(45) Date of Patent: Feb. 14, 2023

(54) WATERPROOF WAX, WATERPROOF TREATMENT METHOD FOR SPLICING PART OF FLOORBOARDS AND SPLICE FLOORBOARD

(71) Applicants: CHANGZHOU BEMATE HOME TECHNOLOGY CO.,LTD., Jiangsu (CN); M S International Inc., Orange (CA)

(72) Inventors: Xiaoling Zhang, Jiangsu (CN); Zhiyuan Xiao, Jiangsu (CN)

(73) Assignees: CHANGZHOU BEMATE HOME TECHNOLOGY CO., LTD., Changzhou (CN); M S International Inc., Orange (CA)

( * ) Notice: Subject to any disclaimer, the term of this patent is extended or adjusted under 35 U.S.C. 154(b) by 0 days.

(21) Appl. No.: 17/344,912

(22) Filed: Jun. 10, 2021

(65) Prior Publication Data

US 2021/0301169 A1    Sep. 30, 2021

Related U.S. Application Data

(63) Continuation of application No. PCT/CN2021/086037, filed on Apr. 9, 2021.

(30) Foreign Application Priority Data

Oct. 28, 2020 (CN) .......................... 202011173219.3

(51) Int. Cl.
| | | |
|---|---|---|
| C09D 15/00 | (2006.01) |
| C09D 4/06 | (2006.01) |
| C09D 7/48 | (2018.01) |
| C09D 7/65 | (2018.01) |
| C09D 191/06 | (2006.01) |
| E04F 15/02 | (2006.01) |
| B27N 3/08 | (2006.01) |
| B27N 3/04 | (2006.01) |
| B27N 7/00 | (2006.01) |
| B27N 1/02 | (2006.01) |
| E04F 15/04 | (2006.01) |

(52) U.S. Cl.
CPC ............... *C09D 15/00* (2013.01); *B27N 1/02* (2013.01); *B27N 3/04* (2013.01); *B27N 3/08* (2013.01); *B27N 7/005* (2013.01); *C09D 4/06* (2013.01); *C09D 7/48* (2018.01); *C09D 7/65* (2018.01); *C09D 191/06* (2013.01); *E04F 15/02016* (2013.01); *E04F 15/02038* (2013.01); *E04F 15/045* (2013.01); *E04F 2290/04* (2013.01)

(58) Field of Classification Search
CPC . C09D 15/00; C09D 7/65; C09D 7/48; C09D 4/06; C09D 191/06; B27N 1/02; B27N 3/04; B27N 3/08; B27N 7/005; E04F 15/02016; E04F 15/02038; E04F 15/045; E04F 2290/04
See application file for complete search history.

(56) References Cited

FOREIGN PATENT DOCUMENTS

| | | |
|---|---|---|
| CN | 103628362 A | 3/2014 |
| CN | 104987791 A | 10/2015 |
| CN | 106783165 A | 5/2017 |
| CN | 108690541 A | 10/2018 |
| CN | 208456036 U | 2/2019 |
| CN | 110511681 A | 11/2019 |

*Primary Examiner* — Robert S Walters, Jr.

(57) ABSTRACT

A waterproof wax, a waterproof treatment method for a splicing part of floorboards and a splice floorboard, relating to floorboards. The waterproof wax includes 60-85% by weight of a first paraffin, 1-15% by weight of a silicone resin, 10-20% by weight of ethylene glycol dimethacrylate, 2-5% by weight of amino silicone oil and 0.1-1% by weight of alkenyl succinate.

8 Claims, No Drawings

WATERPROOF WAX, WATERPROOF TREATMENT METHOD FOR SPLICING PART OF FLOORBOARDS AND SPLICE FLOORBOARD

CROSS-REFERENCE TO RELATED APPLICATIONS

This application is a continuation of International Patent Application No. PCT/CN2021/086037, filed on Apr. 9, 2021, which claims the benefit of priority from Chinese Patent Application No. 202011173219.3, filed on Oct. 28, 2020. The content of the aforementioned applications, including any intervening amendments thereto, is incorporated herein by reference.

TECHNICAL FIELD

The disclosure relates to floorboards, and more particularly to a waterproof wax, a waterproof treatment method for a splicing part of floorboards and a splice floorboard.

BACKGROUND

The splicing part of the existing floorboards is prone to bulging after being soaked in water, thereby influencing the normal use of the floorboards.

In view of the defect in the prior art, the disclosure develops a waterproof wax and a waterproof treatment method using the same.

SUMMARY

A first object of the present disclosure is to provide a waterproof wax, which can not only provide good anti-mildew and waterproof effects, but also eliminate the abnormal sound.

A second object of the present disclosure is to provide a waterproof treatment method for a splicing part of floorboards, which can provide good waterproof and sealing effects on the splicing part of the floorboards.

A third object of the present disclosure is to provide a splice floorboard, which has good anti-mildew and waterproof performance, and is not prone to bulging even after soaked in water.

Technical solutions of the present disclosure are specifically described as follows.

In a first aspect, the present disclosure provides a waterproof wax, comprising:
60-85% by weight of a first paraffin;
1-15% by weight of a silicone resin;
10-20% by weight of ethylene glycol dimethacrylate;
2-5% by weight of amino silicone oil; and
0.1-1% by weight of alkenyl succinate.

In an embodiment, the waterproof wax comprises 70-80% by weight of the first paraffin, 5-10% by weight of the silicone resin, 10-15% by weight of the ethylene glycol dimethacrylate, 3-4% by weight of the amino silicone oil and 0.5-1% by weight of the alkenyl succinate.

In a second aspect, the present disclosure further provides a waterproof treatment method for a splicing part of floorboards, comprising:
applying the waterproof wax to splicing parts of two floorboards matched with each other.

In an embodiment, the waterproof wax is applied in an amount of 1.35-1.45 $g/m^2$.

In an embodiment, a side surface of one of the two floorboards is provided with a female groove; a side surface of the other one of the two floorboards is provided with a male groove; the male groove is matched with the female groove; and the waterproof wax is applied between the female groove and the male groove.

In an embodiment, the waterproof treatment method further comprises:
coating an anti-water agent on a surface of the two floorboards after spliced with each other.

In an embodiment, the anti-water agent is prepared from 30-80% by weight of polyurethane acrylate, 10-60% by weight of diphenylmethane diisocyanate, 1-5% by weight of chlorinated paraffin, 1-2% by weight of a first curing agent, 1-2% by weight of a coupling agent and 0.2-1% by weight of a film-forming aid.

In an embodiment, the anti-water agent is coated in an amount of 0.45-0.55 $g/m^2$.

In an embodiment, main bodies of the two floorboards to be spliced are both made of a waterproof substrate.

In an embodiment, the waterproof substrate is prepared from timber, an adhesive, a second paraffin, a waterproof agent and a second curing agent in a weight ratio of (700-1000):(250-400):(5-15):(1-2):(1-2).

In an embodiment, the timber is selected from the group consisting of poplar, locust tree, elm, willow, pine, camphor tree and a combination thereof, and the timber has a diameter no less than 8 cm.

In an embodiment, the adhesive is a melamine-modified resin.

In an embodiment, the waterproof agent is a paraffin emulsion.

In an embodiment, the second curing agent is ammonium chloride, methyltetramine or a combination thereof.

In an embodiment, a preparation of the waterproof substrate comprises:
mixing the second paraffin, the adhesive, the waterproof agent, the second curing agent and wood fibers prepared from the timber to produce a mixture; and subjecting the mixture to hot-pressing to produce an initial waterproof substrate.

In an embodiment, the hot-pressing is performed at 160-200° C. and 1-3.5 MPa;

In an embodiment, the initial waterproof substrate has a density of 800-850 $g/cm^3$, a static bending strength greater than or equal to 35 MPa, an elastic modulus greater than or equal to 3500 MPa, an internal bonding strength greater than or equal to 1.2 MPa, a thickness swelling rate less than or equal to 12%, a surface bonding strength greater than or equal to 1.2 MPa, and a moisture content of 3-8%.

In an embodiment, the wood fibers have a length less than or equal to 5 mm.

In an embodiment, the wood fibers are prepared through a step of:
subjecting the timber to cooking and hot-grinding in sequence.

In an embodiment, the preparation of the waterproof substrate further comprises:
pre-pressing the mixture to produce a pre-pressed product before the hot-pressing.

In an embodiment, the pre-pressing is performed at 170-190° C. and 1-3 MPa.

In an embodiment, the pre-pressed product has a static bending strength of 5-8 MPa.

In an embodiment, the preparation of the waterproof substrate further comprises:

after the hot-pressing, curing the initial waterproof substrate to produce the waterproof substrate.

In a third aspect, the present disclosure further provides a splice floorboard, comprising: a splicing part treated with the above waterproof treatment method.

Compared to the prior art, the disclosure has the following beneficial effects.

In the waterproof wax, the paraffin as a main component has a desirable waterproof effect; the silicone resin can improve the thermal stability of the paraffin, and further improve the stability and uniformity of the waterproof wax; the ethylene glycol dimethacrylate, on one hand, can improve the thermal resistance, weather resistance and solvent resistance of the waterproof wax, effectively overcoming the defect that the waterproof wax is prone to melting due to a low melting point; on the other hand, can exert a certain sealing effect, preventing the waterproof effect of the paraffin from being affected by external factors; the amino silicone oil mainly plays a role in enhancing the adsorbability and compatibility, improving the compatibility of the waterproof wax itself, and meanwhile strengthening the adsorption between the waterproof wax and the medium and high-density board substrate; the alkenyl succinate mainly plays a role in the film formation to further enhance the waterproof effect.

The waterproof wax prepared by compounding the paraffin, the silicone resin, the ethylene glycol dimethacrylate, the amino silicone oil and the alkenyl succinate according to the specific ratio disclosed herein has good anti-mildew and waterproof effects. In addition, it can also provide a good sealing effect, and facilitates the elimination of abnormal sound.

The method provided herein can effectively improve the water resistance and sealing of the splicing part of the floorboards. The splice floorboard with the splicing part treated by the method of the disclosure is not prone to bulging after soaked in water.

DETAILED DESCRIPTION OF EMBODIMENTS

In order to make the objectives, technical solutions and advantages of the present disclosure clearer, the present disclosure will be described below clearly and completely with reference to the embodiments. Unless otherwise specified, the examples are implemented under normal conditions or as recommended by the manufacturer; and the reagents or apparatuses are all commercially available.

The waterproof wax, the waterproof treatment method for a splicing part of floorboards and the splice floorboard provided herein are specifically illustrated below.

The present disclosure provides a waterproof wax, including: 60-85% by weight of a first paraffin, 1-15% by weight of a silicone resin, 10-20% by weight of ethylene glycol dimethacrylate, 2-5% by weight of amino silicone oil and 0.1-1% by weight of alkenyl succinate.

In an embodiment, the weight percentage of the first paraffin may be 60%, 65%, 70%, 75%, 80% or 85%, or any value in the range of 60-85%.

The weight percentage of the silicone resin may be 1%, 3%, 5%, 8%, 10%, 12% or 15%, or any value in the range of 1-15%.

The weight percentage of the ethylene glycol dimethacrylate may be 10%, 12%, 15%, 18% or 20%, or any value in the range of 10-20%.

The weight percentage of the amino silicone oil may be 2%, 2.5%, 3%, 3.5%, 4%, 4.5% or 5%, or any value in the range of 2-5%.

The weight percentage of the alkenyl succinate may be 0.1%, 0.2%, 0.5%, 0.8% or 1%, or any value in the range of 0.1-1%.

It is worth noting that the contents of various components of the waterproof wax may be freely combined within the above ranges.

In some embodiments, the waterproof wax includes 70-80% by weight of the first paraffin, 5-10% by weight of the silicone resin, 10-15% by weight of the ethylene glycol dimethacrylate, 3-4% by weight of the amino silicone oil and 0.5-1% by weight of the alkenyl succinate.

The paraffin, also called crystalline wax, is usually a white and odorless waxy solid, and has a melt point of 47-64° C. and a density of about 0.9 g/cm$^3$. The paraffin is soluble in a non-polar solvent such as gasoline, carbon disulfide, xylene, diethyl ether, benzene, chloroform, carbon tetrachloride and naphtha, but is insoluble in a polar solvent such as water and methanol. Considering the low melting point and good processibility and hydrophobicity, the paraffin is used as a principal component in the preparation oft the waterproof wax in the present disclosure.

The silicone resin is a highly-crosslinked reticulated polyorganosiloxane, and usually is a mixture of methyltrichlorosilane, dimethyldichlorosilane, phenyltrichlorosilane, diphenyldichlorosilane and methylphenyldichlorosilane. The silicone resin has excellent thermal oxidation stability, electrical insulation property, weather resistance, water resistance, salt-spray resistance, mildew resistance and biocompatibility, and thus is used for improving the thermal stability of the paraffin. Moreover, the silicone resin with a reticulated structure can structurally improve the stability and uniformity of the waterproof wax after combining with the paraffin. In addition, the silicone resin further can provide a certain waterproof effect.

The ethylene glycol dimethacrylate, on one hand, can improve the thermal resistance, weather resistance and solvent resistance of the waterproof wax, which facilitates overcoming the problem that the waterproof wax is prone to melting due to a low melting point; on the other hand, can exert a certain sealing effect, effectively preventing the waterproof performance of the paraffin from being affected by external factors.

The amino silicone oil is mainly used to enhance the compatibility of the waterproof wax and the adsorption of the waterproof wax to the medium and high-density board substrate.

The alkenyl succinate mainly plays a role in forming a film to provide a better protection and waterproof effect.

To sum up, by compounding the paraffin, the silicone resin, the ethylene glycol dimethacrylate, the amino silicone oil and the alkenyl succinate according to the ratio mentioned herein, the waterproof wax can achieve good anti-mildew and waterproof effects. In addition, the waterproof wax can also provide a desirable sealing effect, and effectively eliminate abnormal sound.

It is worth noting that if the paraffin, the silicone resin, the ethylene glycol dimethacrylate, the amino silicone oil and the alkenyl succinate are replaced with other substances having similar effects, the obtained product is exterior to the waterproof wax of the disclosure in the performance.

Moreover, the present disclosure further provides a waterproof treatment method for a splicing part of a floorboard, including:

applying the waterproof wax to splicing parts of two floorboards matched with each other.

In an embodiment, the floorboard is an impregnated paper laminated wood floorboard, and may also be other types of floorboards.

In an embodiment, the waterproof wax is applied in an amount of 1.35-1.45 g/m$^2$, such as 1.35 g/m$^2$, 1.4 g/m$^2$ and 1.45 g/m$^2$. Preferably, the splicing part is evenly sealed by wax without insufficient wax sealing, excessive wax sealing and uneven wax sealing. It is worth noting that a too low applying amount will lead to a worse waterproof effect, and if the excessive applying will easily cause surface pollution and affect the product appearance.

In an embodiment, a side surface of one (defined as a first floorboard) of the two floorboards is provided with a female groove, and a side surface of the other one (defined as a second floorboard) is provided with a male groove; the male groove is matched with the female groove; and the waterproof wax is applied between the female groove and the male groove. Specifically, the waterproof wax is applied at exposed portions of the first floorboard and the second floorboard after being grooved, so as to completely cover a whole splicing surface of the male groove and the female groove.

In an embodiment, the waterproof treatment method further includes:

coating an anti-water agent on a surface of the two floorboards after spliced with each other.

It is worth noting that the "surface" herein is an upper surface and/or a lower surface of the floorboard rather than the side surface of the floorboard provided with the groove. Preferably, the area coated with the anti-water agent contains a floorboard surface area corresponding to the splicing part. Preferably, the anti-water agent is uniformly coated without polluting the floorboard surface.

In an embodiment, the anti-water agent is prepared from 30-80% by weight of polyurethane acrylate, 10-60% by weight of diphenylmethane diisocyanate, 1-5% by weight of chlorinated paraffin, 1-2% by weight of a first curing agent, 1-2% by weight of a coupling agent and 0.2-1% by weight of a film forming aid.

In an embodiment, the weight percentage of the polyurethane acrylate may be 30%, 40%, 50%, 60%, 70% or 80%, or 35%, 45%, 55%, 65% or 75%, or any value in the range of 30-80%.

The weight percentage of the diphenylmethane diisocyanate may be 10%, 20%, 30%, 40%, 50% or 60%, or 15%, 25%, 35%, 45% or 55%, or any value in the range of 10-60%.

The weight percentage of the chlorinated paraffin may be 1%, 2%, 3%, 4% or 5%, or 1.5%, 2.5%, 3.5% or 4.5%, or any value in the range of 1-5%.

The weight percentages of the first curing agent and the coupling agent both may be 1%, 1.5% or 2%, or any values in the range of 1-2%.

The weight percentage of the film forming aid may be 0.2%, 0.5%, 0.8% or 1%, or any value in the range of 0.2-1%.

It is worth noting that the contents of various components of the anti-water agent may be freely combined within the above ranges. In an embodiment, the first curing agent is diethylenetriamine; the coupling agent is a silane coupling agent; and the film forming aid is 2,2,4-Trimethyl-1,3-pentanediol monoisobutyrate. The first curing agent, the coupling agent and the film forming adjuvant may also be other conventional substances in the art, which will not be described in detail herein.

Functions of the components in the above anti-water agent are described as follows.

The polyurethane acrylate has an acrylic functional group and urethane bonds in its molecular structure, so that after cured, the polyurethane acrylate has high abrasion resistance, high adhesion, high flexibility, high peel strength, high waterproof performance, excellent low temperature resistance, good optical property and desirable weather resistance.

The diphenylmethane diisocyanate is mainly used in the adhesion and sealing.

As a chlorinated derivative of paraffin hydrocarbon, the chlorinated paraffin has low volatility and can improve the surface stability. In the present disclosure, it can be used for plasticization to enhance the fluidity of the anti-water agent and make the surface bright and clean. Meanwhile, it is also a hydrophobic material.

The first curing agent is mainly used for accelerating the curing of the anti-water agent after coated at the splicing part to facilitate the subsequent processing. The coupling agent is mainly used for enhancing the interfacial properties of the material. The film forming aid is mainly used for improving the plastic flow and elastic deformation of polymer compounds, thereby improving the coalescence property. The anti-water agent is coated at chamfers of medium and high density boards and can be cured to form a protective film, which has waterproof and anti-pollution effects.

In an embodiment, the anti-water agent may be coated in an amount of 0.45-0.55 g/m$^2$, such as 0.45 g/m$^2$, 0.5 g/m$^2$ and 0.55 g/m$^2$. Similarly, a too low coating amount will lead to poor waterproof effect, and a too high coating amount will easily cause surface pollution and affect the product appearance.

In the present disclosure, main bodies of the two floorboards to be spliced are both made of a waterproof substrate. On this basis, an abrasion-resistant layer or a buffer layer may be further provided on a surface of the waterproof substrate. It should be noted that in the case that the 24-h water absorption swelling rate of the waterproof substrate provided herein does not exceed 9% when there is water on the surface, which complies with the related quality requirements (≤12%). By contrast, the water absorption swelling rate of a common substrate in the prior art reaches 16.5% under the same condition.

In an embodiment, the waterproof substrate is prepared from timber, an adhesive, a second paraffin, a waterproof agent and a second curing agent in a weight ratio of (700-1000):(250-400):(5-15):(1-2):(1-2).

In an embodiment, the timber is selected from the group consisting of poplar, locust tree, elm, willow, pine, camphor tree and a combination thereof. Optionally, the timber may be from the Jianghan Plain and surrounding counties and cities. Preferably, the timber has a diameter no less than 8 cm, ensuring that the wood fibers have desirable toughness and strength.

In an embodiment, the adhesive is a melamine-modified resin; the waterproof agent is a paraffin emulsion; and the second curing agent is ammonium chloride, methyltetramine or a combination thereof.

In an embodiment, a preparation of the waterproof substrate includes:

mixing the second paraffin, the adhesive, the waterproof agent, the second curing agent and wood fibers prepared from the timber to produce a mixture; and subjecting the mixture to hot-pressing to produce an initial waterproof substrate;

where the wood fibers are made from the timber.

In an embodiment, the above wood fibers have a length less than or equal to 5 mm, and in this range, the wood fibers have good laying uniformity, which is advantageous to reduce anisotropy, e.g. strength property, static bending strength and water absorption expansion property.

The wood fibers are prepared through a step of:

subjecting the timber to cooking and hot-grinding in sequence.

In an embodiment, the cooking is performed at 95-100° C. (e.g. 95° C., 98° C. or 100° C.) for 2 h.

In an embodiment, the timber is sliced into chips with a length of 15 cm and a width of 15 cm prior to the cooking. After the slicing process, the wood skin and other impurities are removed, and then the chips are cleaned, and then cooked.

In an embodiment, the hot-pressing is performed at 160-200° C. (e.g. 160° C., 165° C., 170° C., 175° C., 180° C., 185° C., 190° C., 195° C. or 200° C.) and 1-3.5 MPa (e.g. 1 MPa, 1.5 MPa, 2 MPa, 2.5 MPa, 3 MPa or 3.5 MPa). In an embodiment, the hot-pressing is performed using a hot press machine. The adhesive in the raw materials is cured during the hot-pressing. The initial waterproof substrate product obtained by the hot-pressing has a density of 800-850 g/cm$^3$, a static bending strength greater than or equal to 35 MPa, an elastic modulus greater than or equal to 3500 MPa, an internal bonding strength greater than or equal to 1.2 MPa, a thickness swelling rate less than or equal to 12%, a surface bonding strength greater than or equal to 1.2 MPa and a moisture content of 3-8%.

In an embodiment, the preparation of the waterproof substrate further includes:

before the hot-pressing, pre-pressing the mixture to produce a pre-pressed product.

In an embodiment, the pre-pressing is performed at 170-190° C. (e.g. 170° C., 175° C., 180° C., 185° C. or 190° C.) and 1-3 MPa (e.g. 1 MPa, 1.5 MPa, 2 MPa, 2.5 MPa or 3 MPa). Correspondingly, the waterproof substrate blank obtained after the pre-pressing has a static bending strength of 5-8 MPa.

In an embodiment, the preparation of the waterproof substrate further includes:

before the pre-pressing, subjecting the mixture to drying, sorting and laying, where the drying may be performed in a drying pipe until the wood fibers in the mixture has a moisture content of 8-10%; the fibers are sorted to remove thick stalks and fiber agglomerates, and then sent to a main production line to be laid and pre-pressed.

Further, the preparation of the waterproof substrate further includes:

curing the initial waterproof substrate to produce the waterproof substrate;

where the curing treatment may be performed at normal temperature, such as 10-35° C.

After the curing, the waterproof substrate may be subjected to sanding, sawing, sorting and packaging. Optionally, the board-inspecting worker feeds the packaged single carton onto a conveyor belt of a heat shrink packaging machine to be conveyed into a thermoplastic sealing bag, where the plastic packaging is performed at 175±5° C.; the direction of each carton entering the thermoplastic sealing bag is kept the same; and the cartons are orderly stacked after the packaging is completed.

It is worth noting that reference may be made to the prior art for the process parameters and operation conditions omitted herein.

Correspondingly, the present disclosure further provides a splice floorboard, including a splicing part treated with the above waterproof treatment method. The splice floorboard has excellent anti-mildew and waterproof performances, and is not prone to bulging after soaked in water.

The features and performances of the present disclosure will be further described in detail below with reference to examples.

Example 1

Provided herein was a waterproof wax, which was prepared by mixing 60% by weight of a first paraffin, 15% by weight of a silicone resin, 20% by weight of ethylene glycol dimethacrylate, 4% by weight of amino silicone oil and 1% by weight of alkenyl succinate.

Example 2

Provided herein was a waterproof wax, which was prepared by mixing 85% by weight of a first paraffin, 2.9% by weight of a silicone resin, 10% by weight of ethylene glycol dimethacrylate, 2% by weight of amino silicone oil and 0.1% by weight of alkenyl succinate.

Example 3

Provided herein was a waterproof wax, which was prepared by mixing 78.5% by weight of a first paraffin, 1% by weight of a silicone resin, 15% by weight of ethylene glycol dimethacrylate, 5% by weight of amino silicone oil and 0.5% by weight of alkenyl succinate.

Example 4

Provided herein was a waterproof wax, which was prepared by mixing 70% by weight of a first paraffin, 10% by weight of a silicone resin, 15% by weight of ethylene glycol dimethacrylate, 4% by weight of amino silicone oil and 1% by weight of alkenyl succinate.

Example 5

Provided herein was a waterproof wax, which was prepared by mixing 80% by weight of a first paraffin, 5% by weight of a silicone resin, 10% by weight of ethylene glycol dimethacrylate, 4% by weight of amino silicone oil and 1% by weight of alkenyl succinate.

Example 6

Provided herein was a waterproof wax, which was prepared by mixing 75% by weight of a first paraffin, 9% by weight of a silicone resin, 12.5% by weight of ethylene glycol dimethacrylate, 3% by weight of amino silicone oil and 0.5% by weight of alkenyl succinate.

Example 7

Provided herein was a waterproof treatment method for a splicing part of an impregnated paper laminated wood floorboard, which was specifically described as follows.

A main body of the impregnated paper laminated wood floorboard was made of a waterproof substrate, which was prepared from timber, an adhesive, a second paraffin, a waterproof agent and a second curing agent in a weight ratio of 850:300:10:1.5:1.5. The timber was derived from poplar, locust tree, pine and camphor tree with a diameter of 8-15 cm from the Jianghan Plain and surrounding counties and cities. The adhesive was a melamine-modified resin; the waterproof agent was a paraffin emulsion; and the second curing agent was ammonium chloride.

The above waterproof substrate was prepared as follows. The timber was cut into chips each having a length and width of 15 cm, and the wood skin and other impurities were removed. The chips were cleaned, cooked in a boiling water tank (100° C.) for 2 h, and then defibrated into wood fibers with a length less than or equal to 5 mm. Subsequently, the wood fibers were added with the second paraffin, the adhesive, the waterproof agent and the second curing agent mixed, and dried in a drying pipe until the moisture content of the wood fibers was 8-10% where the dried wood fibers were sorted to remove thick stalks and fiber agglomerates. Then the mixture was fed into a main production line to be paved, and pre-pressed at 180° C. and 2 MPa to form a waterproof substrate blank having a static bending strength of 5-8 MPa. Then the waterproof substrate blank was subjected to hot-pressing at 180° C. and 3 MPa using a hot press machine to cure the adhesive in the waterproof substrate blank to produce an initial waterproof substrate, which had a density of 800-850 g/cm$^3$, a static bending strength greater than or equal to 35 MPa, an elastic modulus greater than or equal to 3500 MPa, an internal bonding strength greater than or equal to 1.2 MPa, a thickness swelling rate less than or equal to 12%, a surface bonding strength greater than or equal to 1.2 MPa and a moisture content of 3-8%. Subsequently, the initial waterproof substrate was subjected to normal-temperature curing at a storage area, and then underwent sanding, sawing, sorting and packaging.

The waterproof substrate above was grooved according to a preset requirement, and the first floorboard having a female groove on a side surface and the second floorboard having a male groove on a side surface were matched and spliced. During the splicing process, the waterproof wax provided in Example 5 was applied between the female groove and the male groove in an amount of 1.4 g/m$^2$ to completely cover a splicing surface of the male groove and the female groove. After the splicing, an anti-water agent was coated on the surfaces of the first floorboard and the second floorboard in an amount of 0.5 g/m$^2$, and the area coated with the anti-water agent covered a floorboard surface area corresponding to the splicing part. The anti-water agent included 70% by weight of polyurethane acrylate, 20% by weight of diphenylmethane diisocyanate, 5% by weight of chlorinated paraffin, 2% by weight of diethylenetriamine, 2% by weight of a silane coupling agent and 1% by weight of texanol.

Example 8

This example was different from Example 7 merely in that the waterproof wax provided in Example 5 was applied between the female groove and the male groove above in an amount of 1.35 g/m$^2$, and the anti-water agent was coated on the surfaces of the first floorboard and the second floorboard in an amount of 0.45 g/m$^2$.

Example 9

This example was different from Example 7 merely in that the waterproof wax provided in Example 5 was applied between the female groove and the male groove above in an amount of 1.45 g/m$^2$, and the anti-water agent was coated on the surfaces of the first floorboard and the second floorboard in an amount of 0.55 g/m$^2$.

Example 10

This example was different from Example 7 merely in that in this example, the waterproof substrate was prepared from timber, the adhesive, the second paraffin, the waterproof agent and the second curing agent in a weight ratio of 700:250:5:1:1; the timber was derived from elm, willow and camphor tree with a diameter of 8-15 cm from the Jianghan Plain and surrounding counties and cities; the second curing agent was methyltetramine; the cooking was performed at 95° C. for 2 h; the pre-pressing was performed at 170° C. and 3 MPa; the hot-pressing was performed at 160° C. and 3.5 MPa; and the anti-water agent included 30% by weight of polyurethane acrylate, 60% by weight of diphenylmethane diisocyanate, 5% by weight of chlorinated paraffin, 1% by weight of diethylenetriamine, 1% by weight of a silane coupling agent and 1% by weight of texanol.

Example 11

This example was different from Example 7 merely in that in this example, the waterproof substrate was prepared from timber, the adhesive, the second paraffin, the waterproof agent and the second curing agent in a weight ratio of 1000:400:15:2:2; the timber was derived from poplar, elm, locust tree and pine with a diameter of 8-15 cm from the Jianghan Plain and surrounding counties and cities; the second curing agent was a mixture of ammonium chloride and methyltetramine in a weight ratio of 1:1; the pre-pressing was performed at 190° C. and 1 MPa; the hot-pressing was performed at 200° C. and 1 MPa; and the anti-water agent included 80% by weight of polyurethane acrylate, 10% by weight of diphenylmethane diisocyanate, 5% by weight of chlorinated paraffin, 2% by weight of diethylenetriamine, 2% by weight of a silane coupling agent and 1% by weight of texanol.

Example 12

This example was different from Example 11 merely in that the anti-water agent included 80% by weight of polyurethane acrylate, 16.8% by weight of diphenylmethane diisocyanate, 1% by weight of chlorinated paraffin, 1% by weight of a first curing agent, 1% by weight of a coupling agent and 0.2% by weight of a film-forming aid.

Example 13

This example was different from Example 11 merely in that the anti-water agent included 55% by weight of polyurethane acrylate, 38.5% by weight of diphenylmethane diisocyanate, 3% by weight of chlorinated paraffin, 1.5% by weight of diethylenetriamine, 1.5% by weight of a silane coupling agent and 0.5% by weight of texanol.

Experimental Example 1

Test was carried out at a field of 1840 mm in length and 940 mm in width, about 1.73 m$^2$ in total. This field was floored with the impregnated paper laminated wood floorboards provided in Example 7. 1000 mL of water was poured onto surfaces of the floorboards, and the reduction and absorption of water on the floorboard surface were observed after 72 hours. The results showed that the height of water surface on the floorboard did not lower, and the floorboard did not suffer bulging, indicating that the waterproof treatment method provided in the present disclosure can achieve a good waterproof effect.

Experimental Example 2

The waterproof wax provided in Example 5 was used as an experimental group, and six control groups (Groups 1-6)

were set, where composition of the experimental group and the control groups 1-6 were presented in Table 1.

TABLE 1

Composition of the waterproof wax of Example 5 and the control groups 1-6

|  | First Paraffin | Silicone Resin | Ethylene Glycol Dimethacrylate | Amino Silicone Oil | Alkenyl succinic acid ester |
|---|---|---|---|---|---|
| Example 5 | 80 | 5 | 10 | 4 | 1 |
| Control Group 1 | 85 | — | 10 | 4 | 1 |
| Control Group 2 | 95 | 5 | — | 4 | 1 |
| Control Group 3 | 84 | 5 | 10 | — | 1 |
| Control Group 4 | 81 | 5 | 10 | 4 | — |
| Control Group 5 | — | 25 | 30 | 24 | 21 |
| Control Group 6 | 50 | 15 | 30 | 4 | 1 |

Floorboards were divided into seven groups each for two, and the two floorboards in each group were matched with each other. The joints of the two floorboards in the seven groups were coated with the waterproof wax of Example 5 and the Control Groups 1-6, respectively, and surfaces of the floorboards were coated with the anti-water agent of Example 7. Water was poured onto the surfaces and the joint of the two floorboards in each group and kept for 72 h to test the waterproof and anti-mildew performance. The results demonstrated that neither the surface nor the joint of the floorboards treated with the waterproof was in Example 5 became mildewed, and did not suffer bulging and water penetration. By comparison, the Control Groups 1-6 experienced different degrees of bulging and mildewing.

It can be seen from the comparison between the Example 5 and Control Groups 1-6 that the first paraffin, the silicone resin, the ethylene glycol dimethacrylate, the amino silicone oil and the alkenyl succinate have a certain synergistic effect, and the compounding proportion provided in the present disclosure allowed for better performance.

Experimental Example 3

Example 7 was taken as an experimental group, and Control Groups 7-9 were provided.

The Control Group 7 was different from Example 7 merely in that the waterproof substrate was replaced with an ordinary substrate.

The Control Group 8 was different from Example 7 merely in that no waterproof wax was applied between the male groove and the female groove of the splice floorboards.

The Control Group 9 was different from Example 7 merely in that after the waterproof wax was applied, no anti-water agent was coated on the surface of the waterproof substrate.

The reduction and absorption of water on the floorboard surface of each group were measured according to the method in Experimental Example 1. The results showed that compared to the Experimental Example 1, the height of the water on the floorboard surface in Control Groups 7-9 experienced different degrees of decrease, and the floorboards in the Control Groups 7-9 showed the bulging, reversely indicating that the waterproof treatment method provided in the present disclosure can provide a desirable waterproof effect for the splice floorboards.

To sum up, the waterproof wax provided in the present disclosure has good anti-mildew and waterproof performances, and meanwhile can also eliminate the abnormal sound. Moreover, the waterproof wax also has simple preparation and is easy to use. The waterproof treatment method provided in the present disclosure can achieve a good waterproof and sealing effect at the splicing part of the floorboards. The splice floorboard provided herein has excellent anti-mildew and waterproof performances and is not prone to bulging after soaked in water.

Described above are merely preferred embodiments of the present disclosure, and are not intended to limit the present disclosure. It should be noted that various modifications, changes, improvements and replacements made by those skilled in the art without departing from the spirit of the disclosure should fall within the scope of the disclosure.

INDUSTRIAL APPLICABILITY

The waterproof wax provided in the present disclosure has good anti-mildew and waterproof performances, and meanwhile can also eliminate the abnormal sound. Moreover, the waterproof wax also has simple preparation and is easy to use, and thus is suitable for the industrial production. The waterproof treatment method provided in the present disclosure can achieve a good waterproof and sealing effect at the splicing part of the floorboards. The splice floorboard provided herein has excellent anti-mildew and waterproof performances and is not prone to bulging after soaked in water, having a promising application prospect.

What is claimed is:

1. A waterproof treatment method for a splicing part of floorboards, comprising:
   applying a waterproof wax to splicing parts of two floorboards matched with each other; and
   coating an anti-water agent on a surface of the two floorboards after spliced with each other;
   wherein the waterproof wax is applied in an amount of 1.35-1.45 g/m$^2$;
   the waterproof wax comprises 60-85% by weight of a first paraffin, 1-15% by weight of a silicone resin, 10-20% by weight of ethylene glycol dimethacrylate, 2-5% by weight of amino silicone oil and 0.1-1% by weight of alkenyl succinic acid ester;
   a side surface of one of the two floorboards is provided with a female groove; a side surface of the other one of the two floorboards is provided with a male groove; the male groove is matched with the female groove; and the waterproof wax is applied between the female groove and the male groove;
   the anti-water agent is prepared from 30-80% by weight of polyurethane acrylate, 10-60% by weight of diphenylmethane diisocyanate, 1-5% by weight of chlorinated paraffin, 1-2% by weight of a first curing agent, 1-2% by weight of a coupling agent and 0.2-1% by weight of a film-forming aid; the anti-water agent is coated in an amount of 0.45-0.55 g/m$^2$;
   main bodies of the two floorboards are both made of a waterproof substrate; the waterproof substrate is prepared from wood fibers, an adhesive, a second paraffin, a waterproof agent and a second curing agent in a weight ratio of 700-1000:250-400:5-15:1-2:1-2;

the adhesive is a melamine-modified resin; the waterproof agent is a paraffin emulsion; and the second curing agent is ammonium chloride, methyltetramine or a combination thereof.

2. The waterproof treatment method according to claim 1, characterized in that the two floorboards are both an impregnated paper laminated wood floorboard.

3. The waterproof treatment method according to claim 1, characterized in that the wood fibers are prepared from a timber; and the timber is selected from the group consisting of poplar, locust tree, elm, willow, pine, camphor tree and a combination thereof.

4. The waterproof treatment method according to claim 3, characterized in that the timber has a diameter no less than 8 cm.

5. The waterproof treatment method according to claim 1, characterized in that a preparation of the waterproof substrate comprises: mixing the second paraffin, the adhesive, the waterproof agent, the second curing agent and the wood fibers prepared from a timber to produce a mixture; and subjecting the mixture to hot-pressing to produce an initial waterproof substrate;
the hot-pressing is performed at 160-200° C. and 1-3.5 MPa;
wherein the initial waterproof substrate has a density of 800-850 g/cm$^3$, a static bending strength greater than or equal to 35 MPa, an elastic modulus greater than or equal to 3500 MPa, an internal bond strength greater than or equal to 1.2 MPa, a thickness swelling rate less than or equal to 12%, a surface bonding strength greater than or equal to 1.2 MPa, and a moisture content of 3-8%.

6. The waterproof treatment method according to claim 5, characterized in that the wood fibers are prepared through a step of:
subjecting the timber to cooking and defibrating in sequence;
wherein the wood fibers have a length less than or equal to 5 mm.

7. The waterproof treatment method according to claim 5, characterized in that the preparation of the waterproof substrate further comprises: pre-pressing the mixture to produce a pre-pressed product before the hot-pressing;
wherein the pre-pressing is performed at 170-190° C. and 1-3 MPa; and
the pre-pressed product has a static bending strength of 5-8 MPa.

8. The waterproof treatment method according to claim 5, characterized in that the preparation of the waterproof substrate further comprises: after the hot-pressing, curing the initial waterproof substrate to produce the waterproof substrate.

* * * * *